July 9, 1957 W. F. MARION, JR 2,798,476
TELESCOPIC PORTABLE STOVES
Filed Dec. 27, 1954 2 Sheets-Sheet 1
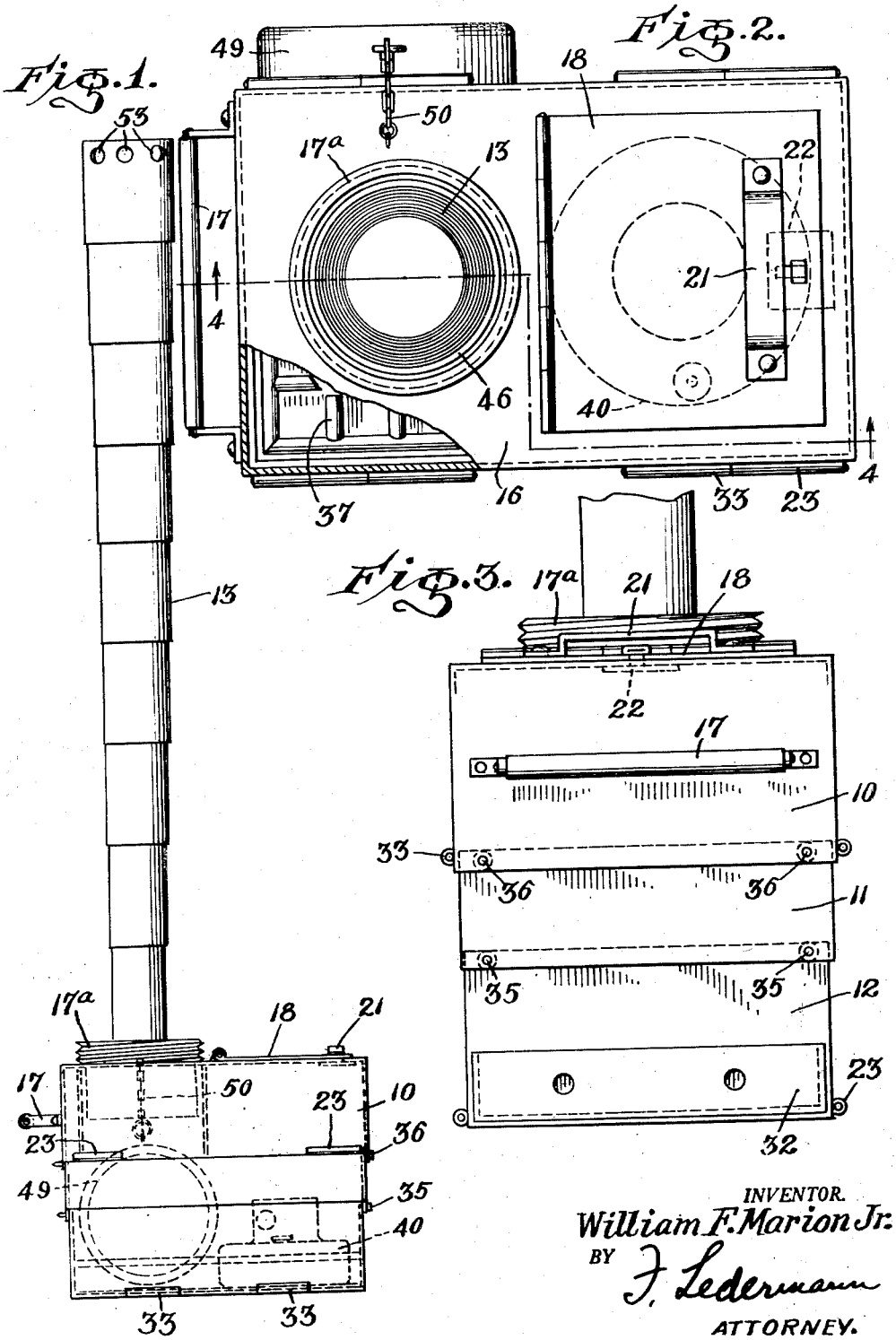
INVENTOR.
William F. Marion Jr.
BY
F. Ledermann
ATTORNEY.

July 9, 1957
W. F. MARION, JR
2,798,476
TELESCOPIC PORTABLE STOVES
Filed Dec. 27, 1954
2 Sheets-Sheet 2
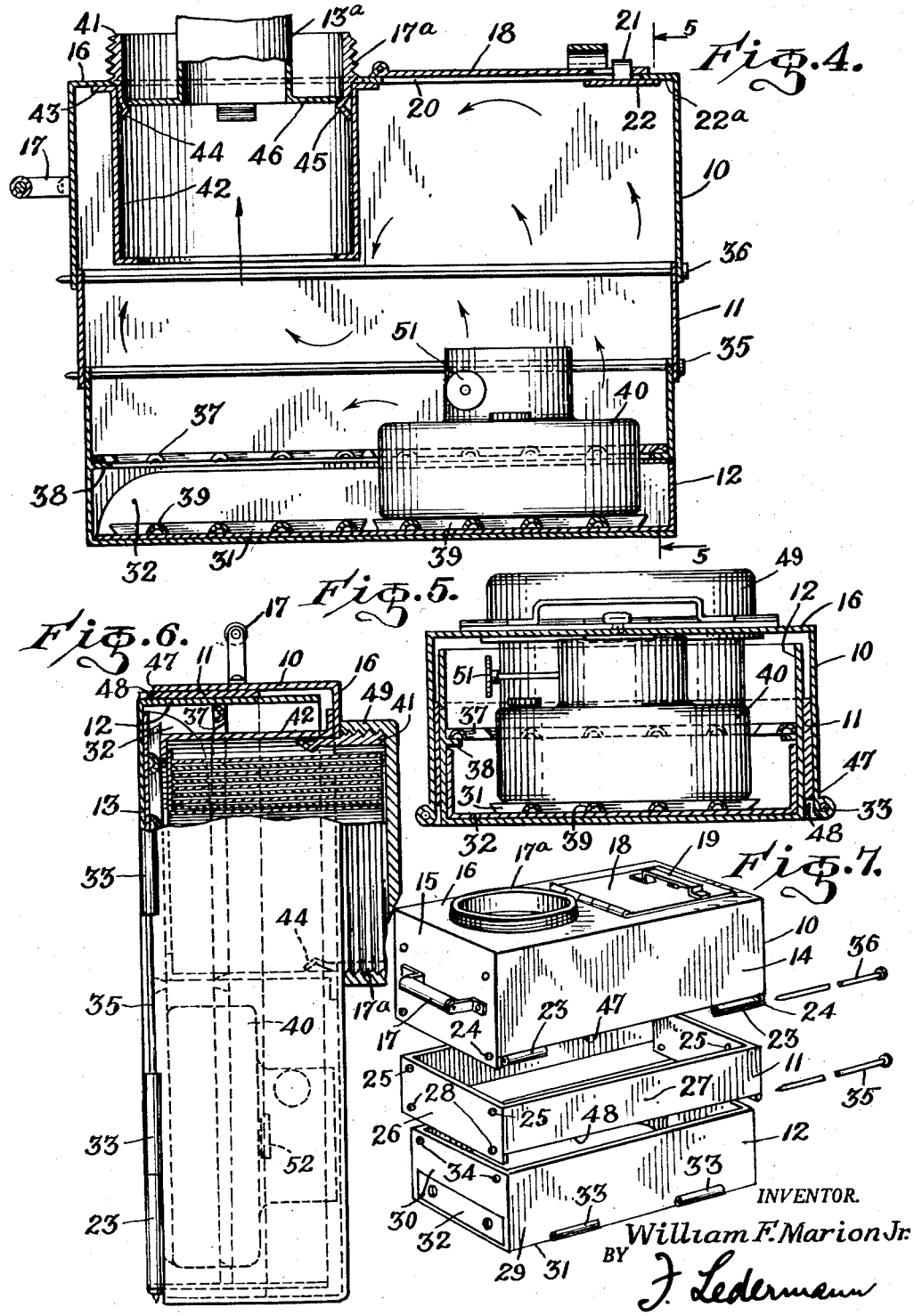
INVENTOR.
William F. Marion Jr.
BY J. Ledermann
ATTORNEY.

United States Patent Office 2,798,476
Patented July 9, 1957

2,798,476

TELESCOPIC PORTABLE STOVES

William F. Marion, Jr., Brooklyn, N. Y.

Application December 27, 1954, Serial No. 477,860

3 Claims. (Cl. 126—9)

This invention relates to a portable stove of miniature size adaptable for instant use and which can be carried conveniently by hand without appreciable effort. A prime necessity for outdoor camping, picknicking, military bivouacs, or other occasions where heating facilities are not available, is a portable heating unit or stove. To be suitable for such a purpose the heating unit must be compact, provide adequate heat, be convertible to an operative form in a minimum of time, and be conveniently transportable manually.

The conventional portable stove does not efficiently satisfy the above requirements since the space required to house a complete operative unit including a smoke stack, a grate, and a heater, is excessive. If only reduced dimensions are restorted to to decrease the bulk of the unit to convenient portable dimensions, the operativeness of the stove is adversely affected. Consequently, means additional to mere miniaturization must be provided to realize a more satisfactory solution to the problem.

Thus it is the primary object of the present invention to provide a portable stove which is convertible from a compact and very small mass conveniently transportable, into an efficiently operable heating unit capable of emitting sufficient heat for both heating and cooking purposes while involving the expenditure of a minimum of effort and time.

Another object of the invention is the provision of a portable stove including a heater, a grate and a smoke stack, arranged to afford adequate heating and cooking facilities and which can rapidly be converted into a compact small mass and form suitable for transporting by hand as well as by other possible means.

A further object is the provision of a stove compactly engineered and comprising a heating unit, a grate and a smoke stack, which can be readily collapsed into a much smaller mass without removing any of the essential component parts.

The above as well as additional and more specific objects will be clarified in the following description wherein reference numerals refer to like-numbered parts in the accompanying drawings. It is to be noted that the drawings are intended solely for the purpose of illustration and that it is therefore neither desired nor intended to limit the invention necessarily to any or all of the exact details of construction shown except insofar as they may be deemed essential to the invention.

Referring briefly to the drawings, Fig. 1 is a front elevational view of the stove fully assembled and ready for use.

Fig. 2 is a top plan view of the assembled stove.

Fig. 3 is an end elevational view of the same.

Fig. 4 is a sectional view taken on the line 4—4 of Fig. 2.

Fig. 5 is a sectional view taken on the line 5—5 of Fig. 4 with the stove collapsed.

Fig. 6 is a front elevational view, with parts broken away and partly in section, of the stove in collapsed condition and ready to be carried.

Fig. 7 is an exploded perspective view of the various telescoping sections prior to final operative assembly.

Referring in detail to the drawings, and initially to Fig. 7, the stove assembly comprises an outer section 10, an intermediate section 11, and an inner bottom section 12 of substantially rectangular form. The final operative assembly includes also the telescopic smoke stack 13 as better seen in Fig. 1, in extended position, that is, with its smallest-diameter segment 13a at the bottom. The topmost or widest-diameter segment is provided with circumferentially spaced vents 53.

The outer section 10 (Figs. 7 and 4) comprises the spaced side walls 14 connected integrally to the transverse end walls 15 and a top closure 16. A handle 17 is secured to one end wall 15, and the other end wall 15 is used for a supporting surface as depicted in Fig. 6. The top closure 16 includes an externally threaded stack fitting 17a which projects transversely through an aperture in the top closure 16. The details of the stack fitting 17a will later be more fully described. Adjacent the fitting 17a there is provided a hinged cover 18 having a handle 19; the cover is hinged to the top surface of the closure 16 and sealingly contacts a peripheral surface about an aperture 20 through the closure 16. A reciprocable latch 21 is slidably secured to the cover 18 and is movable longitudinally to a position wherein the depending flange 22 underlies the edge 22a of the closure 16. When so positioned the cover 18 cannot be opened, thereby sealing the aperture 20. To open the cover latch 21 is moved longitudinally toward the hinged end of the cover, thereby releasing the flange 22 for relative outward opening movement. At the lower edge of each of the side walls 14 there are provided a set of spaced tubular pin holders 23 in axial alignment. The axis of the pin holders is parallel to and spaced from the side walls. The lower edges of the end walls 15 project vertically beyond the lower edges of the side walls 14 and include four perforations 24 spaced inwardly from the outer edges of the walls 15. The perforations 24 serve to receive a set of pins which also pass through upper pairs of perforations 25 thereby securing the sections together in the extended form as more fully described below.

The intermediate section 11 comprises spaced end walls 26 and spaced side walls 27, joined integrally in a rectangular form and open at the top and bottom. The inside dimensions of the outer section 10 are slightly larger than the outside dimensions of the intermediate section, thus permitting the outer section 10 to telescope snugly about the intermediate section 11. In addition to the aforementioned perforations 25, two sets of aligned lower perforations 28 are also provided through the end walls 15 for securing purposes in the collapsed carrying position of Fig. 6.

The bottom section 12 comprises a box-like structure comprising side walls 29, end walls 30, and a bottom 31. One of the end walls 30 is apertured at the base to provide access for an ash pan 32 which is reciprocably slidable along the bottom 31. Consequently the accumulation of ashes, dust, etc., can be removed instantly by withdrawing the pan 32. Two sets of tubular pin holders 33, each set in axial alignment, project laterally from each of the side walls 29. The exterior dimensions of the bottom section are slightly smaller than the inside dimensions of the intermediate section whereby the latter can be telescoped snugly about the bottom section in the collapsed position.

In assembling the sections for operation as a stove, the outer section 10 is first removed, then the intermediate section is raised relative to the bottom section 12 until the perforations 28 are in alignment with two sets of aligned perforations 34 provided adjacent the upper and outer edges of the end walls 30 of the lower section 12. Elongated pins 35 are then inserted through the aligned perforations, thereby securing sections 12 and 11 to each other. The outer section 10 is then slid down over the section 11 until the perforations 24 are aligned with the perforations 25 of the section 11, and a second set of elongated pins 36 are inserted therethrough, affixing the outer section 10 to the intermediate section 11, as seen in Fig. 4.

The bottom section 12 also includes a rectangular grate 37 which is supported transversely adjacent the side and end walls by a peripheral flange 38, Fig. 4, mounted integrally along the interior of the said walls. Central portions 39 are removable from the grate 37 and rest beneath the grate upon the ash pan 32 when it is desired to collapse the stove and/or provide space for the insertion of a heater 40. The removable grate portions make it possible to secure the heater 40 adjacent either end wall within the apertures through the grate. Objects to be heated can then be supported by the grate, with the removable portions 39 in place adjacent the area occupied by the heater. Any conventional gasoline, kerosene, etc. heater unit can be employed having dimensions consonant with the space provided in the stove.

Referring again to Fig. 4, the stack fitting 17a which is mounted within an aperture in the closure 16, further comprises an outer externally threaded portion 41 and an inner portion 42 which serves as an inlet for the smoke stack. Owing to the projection of the inner portion 42 substantially beneath the closure 16, the walls of the portion 42 act as a baffle for the heated air currents which are deflected downward toward the grate portion which is adjacent the heater and which is also directly beneath the stack inlet 42. Consequently the heat generated by the heater 40 is thoroughly circulated through the interior of the stove, causing a desirable uniform external heat emission. Both stack portions 41 and 42 are integrally joined, and they further include an external flange 43 which projects peripherally from the fitting at a point axially proximate the beginning of the threads. The said flange is secured by welding or the like, to the closure material girdling the aperture. A lower skirt 44 projects integrally from the outer portion 41 through the aperture and within the inner portion 42, and is provided with an annular lip 45 which restricts the passageway through the fitting. The lip 45 is formed by crimping the skirt, and it provides a resilient support for an inner flange 46 from which the lowermost segment 13a of the stack 13 extends integrally upward. By using a resilient material for the skirt 44, the lip 45 can be resiliently expanded by exerting a downward pressure upon the stack 13, whereby the flange 46 can be projected beyond the lip 45 for the purpose of collapsing the unit.

To collapse the stove to the form shown in Figs. 5 and 6, the pins 35 and 36 are first removed and the sections 11 and 10 are respectively telescoped about the bottom section 12. It is to be noted (Fig. 5) that the height of the bottom section 12 is slightly less than that of the outer section 10, thus providing clearance between the upper edge of section 12 and the closure 16 of the section 10. Thus the fully collapsed height of the stove is approximately that of the section 10, the height of section 11 being less than that of the other two sections. The lower edges 47 and 48 of the sections 11 and 10, respectively, bear upon the holders 33, and the pin holders 23 of section 10 align themselves with the holders 33. When so positioned the pins 36 are inserted through the pin holders 23 and 33, thus securing the telescoped sections together. Since the stack inlet 42 extends virtually to the lower edge 48 of the outer section 10, clearance through the grate 37 must be provided. This space is provided by displacement of the portion 39 to the position indicated in Fig. 4. The stack 13 is then collapsed and inserted into the fitting 17a. A cover 49, internally threaded, is secured to the outer portion 41. The overall collapsed height of the stack 13 is slightly less than the distance between the outer edge of the fitting and the removable grate portion 39, permitting the stack to be enclosed by the cover 49. During operation of the stove, the cover is suspended from the closure 16 by a chain 50.

To remove the heater 40 for repair, refueling or for any other purpose, the latch 21 is disengaged and the cover 18 is opened. The wick of the heater can then be adjusted by the handle 51 and fuel may be added by removing the cap 52. These ends may be achieved with the stove in either the operable extended position or in the collapsed portable position. Since all of the interior movable components are snugly secured within the sections which form a housing, the unit can be moved to any position without incurring damage or subsequent faulty operation.

As a result of the provision herein disclosed, permitting of very substantial expansion or contraction of the vertical dimensions of the stove, in combination with the novel internal arrangement of and for the heater, a fully operative and efficient stove of minimum size is attained. Moreover, owing to the eccentric location of the heater relative to the smoke stack, not only is vertical contraction made more feasible but the heat flow is thoroughly distributed within the walls of the stove to provide a uniform external heating effect and a smaller heat loss through the smoke stack.

Thus the provision of good thermal efficiency, compact internal arrangement, and the variability of the vertical dimensions, all combine to make possible the fabrication of a portable stove unit of exceedingly small size and yet capable of providing sufficient heat for the purposes intended. More specifically, an operative unit has been provided, which in practice may be two and one-half to three inches in height, five inches wide, and eight inches long. These dimensions are stated, not to restrict the scope of the invention, but to further emphasize the extent to which miniaturization can be carried out by the disclosed arrangement.

Any conventional light-weight, heat resistant material is suitable for fabrication of the various sections. The handle 17 is preferably made of wood, plastic, or other suitable material.

Obviously, modifications in form or structure may be made without departing from the spirit and scope of the invention as herein disclosed and claimed.

I claim:

1. A portable stove comprising a housing including a plurality of telescopically engaged sections vertically movable with respect to each other, each of said sections including opposed end walls and opposed side walls, said housing thereby being adapted to be extended or collapsed, the topmost of the sections having a top closure, the bottommost of the sections having a bottom closure, means for retaining said sections in collapsed or extended positions, said top closure having an opening therethrough, a collapsible telescopic stack mounted to project downwardly from said opening when in collapsed position and upwardly from said opening when in extended position, a grate mounted in the housing between said side walls of the bottom-most section, said grate having a removable portion in alignment with said opening whereby the stack when in collapsed position projects through the aperture created by removal of said removable portion of the grate when the stove is collapsed.

2. A portable stove comprising a housing including a plurality of telescopically engaged sections vertically movable with respect to each other, each of said sections including opposed end walls and opposed side walls, said housing thereby being adapted to be extended or collapsed, the topmost of said sections having a top closure, the bottom-most of said sections having a bottom closure, means for retaining said sections in collapsed or extended positions, said top closure having an opening therethrough, a tubular fitting mounted in said opening, a collapsible telescopic smoke stack mounted in and enclosed by said fitting when said stack is in collapsed position, said fitting including an inner stack inlet portion of slightly smaller length than the distance between said closures when the stove is collapsed, a grate secured transversely in one of said sections and provided with a removable portion large enough to receive the stack fitting when the stove is collapsed, a heater removably mounted within the stove eccentrically with respect to the stack fitting, a grate secured transversely in one of said sections and provided with a removable portion large enough to receive the stack fitting when the stove is collapsed.

3. A portable stove according to claim 2, having a cover pivoted to the top closure in alignment with the heater and providing an access port for removing the heater.

References Cited in the file of this patent

UNITED STATES PATENTS

| 1,068,461 | Spahr | July 29, 1913 |
| 1,616,663 | Macomber | Feb. 8, 1927 |
| 2,517,254 | Steele | Aug. 1, 1950 |
| 2,607,334 | Perlman | Aug. 19, 1952 |

FOREIGN PATENTS

| 3,710 | Great Britain | of 1886 |